United States Patent
Zhang et al.

(10) Patent No.: US 11,372,678 B2
(45) Date of Patent: Jun. 28, 2022

(54) DISTRIBUTED SYSTEM RESOURCE ALLOCATION METHOD, APPARATUS, AND SYSTEM

(71) Applicant: ALIBABA GROUP HOLDING LIMITED, Grand Cayman (KY)

(72) Inventors: Yang Zhang, Beijing (CN); Yihui Feng, Beijing (CN); Jin Ouyang, Beijing (CN); Qiaohuan Han, Beijing (CN); Fang Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/799,616

(22) Filed: Feb. 24, 2020

(65) Prior Publication Data
US 2020/0192711 A1    Jun. 18, 2020

Related U.S. Application Data

(63) Continuation of application No. PCT/CN2018/100579, filed on Aug. 15, 2018.

(30) Foreign Application Priority Data

Aug. 24, 2017   (CN) .......................... 201710737516.8

(51) Int. Cl.
  *G06F 9/46*    (2006.01)
  *G06F 9/50*    (2006.01)
  (Continued)

(52) U.S. Cl.
  CPC ............ *G06F 9/5005* (2013.01); *G06F 9/485* (2013.01); *H04L 47/783* (2013.01); *H04L 47/827* (2013.01)

(58) Field of Classification Search
  CPC ................... G06F 9/5005; G06F 9/485; G06F 2209/5021; G06F 2209/483; G06F 9/505;
  (Continued)

(56) References Cited

U.S. PATENT DOCUMENTS

| | | | | |
|---|---|---|---|---|
| 5,862,485 A | * | 1/1999 | Linneweh, Jr. | ..... H04W 12/001 455/450 |
| 6,081,513 A | * | 6/2000 | Roy | .................... H04Q 11/0478 370/260 |

(Continued)

FOREIGN PATENT DOCUMENTS

| | | |
|---|---|---|
| CN | 102761469 A | 10/2012 |
| CN | 103294533 A | 9/2013 |

(Continued)

OTHER PUBLICATIONS

Gupta, Priya et al. "Cloud Computing Through Dynamic Resource Allocation Scheme". International Conference on Electronics, Communication and Aerospace Technology. (Year: 2017).*

(Continued)

*Primary Examiner* — Adam Lee
(74) *Attorney, Agent, or Firm* — Finnegan, Henderson, Farabow, Garrett & Dunner, LLP

(57) ABSTRACT

Embodiments of the present disclosure can provide distributed system resource allocation methods and apparatuses. The method comprises: receiving a resource preemption request sent by a resource scheduling server, the resource preemption request comprising job execution information corresponding to a first job management server; determining, according to the job execution information corresponding to the first job management server and comprised in the resource preemption request, resources to be returned by a second job management server and a resource return deadline; and returning, according to and the resource return deadline and a current job execution progress of the second (Continued)

job management server, the resources to be returned to the resource scheduling server before expiration of the resource return deadline.

6 Claims, 10 Drawing Sheets

(51) Int. Cl.
   *G06F 9/48* (2006.01)
   *H04L 47/783* (2022.01)
   *H04L 47/70* (2022.01)

(58) Field of Classification Search
   CPC ... G06F 9/4818; G06F 9/5022; H04L 47/783; H04L 47/827; H04L 41/0893; H04L 41/5022; H04L 67/10; H04L 67/322
   See application file for complete search history.

(56) References Cited

U.S. PATENT DOCUMENTS

| | | | |
|---|---|---|---|
| 7,139,846 B1* | 11/2006 | Rossi | G06F 11/1461 710/6 |
| 8,896,867 B2* | 11/2014 | Gross | G06F 3/1212 358/1.15 |
| 10,089,144 B1* | 10/2018 | Nagpal | G06F 9/5027 |
| 2001/0012986 A1* | 8/2001 | Conan | G06F 11/3688 702/188 |
| 2003/0022395 A1* | 1/2003 | Olds | C30B 29/403 438/3 |
| 2005/0149684 A1* | 7/2005 | Sankaran | G06F 11/1458 711/162 |
| 2006/0016885 A1* | 1/2006 | Roberts | G08B 13/2402 235/383 |
| 2007/0067586 A1* | 3/2007 | Mikami | G06F 11/1458 711/162 |
| 2007/0225962 A1* | 9/2007 | Brunet | G06F 11/1456 703/23 |
| 2008/0065663 A1* | 3/2008 | Farlee | G06F 11/1458 |
| 2008/0189416 A1* | 8/2008 | Yamada | H04L 65/80 709/226 |
| 2009/0083746 A1 | 3/2009 | Katsumata | |
| 2009/0133029 A1 | 3/2009 | Varadarajan et al. | |
| 2010/0131959 A1* | 5/2010 | Spiers | G06F 9/50 718/105 |
| 2010/0191881 A1* | 7/2010 | Tauter | G06Q 10/06 710/104 |
| 2012/0110584 A1* | 5/2012 | Chaudhry | G06F 9/5027 718/102 |
| 2012/0144039 A1 | 6/2012 | Watson et al. | |
| 2015/0055460 A1* | 2/2015 | Sunnell | H04W 28/0215 370/230 |
| 2015/0154714 A1* | 6/2015 | Yoneda | G06Q 40/08 705/4 |
| 2015/0161749 A1* | 6/2015 | Huang | G06Q 10/00 705/310 |
| 2017/0220379 A1 | 8/2017 | Lemarinier et al. | |
| 2017/0315843 A1* | 11/2017 | Dhuse | G06F 13/4221 |
| 2018/0060132 A1* | 3/2018 | Maru | G06F 16/24553 |
| 2018/0321979 A1* | 11/2018 | Bah | G06F 9/505 |

FOREIGN PATENT DOCUMENTS

| | | |
|---|---|---|
| CN | 104079503 A | 10/2014 |
| WO | WO2011/050633 A1 | 5/2011 |
| WO | WO2017/092525 A1 | 6/2017 |
| WO | WO 2019/037626 A1 | 2/2019 |

OTHER PUBLICATIONS

Goutam, Shubhakankshi et al. "Preemptable Priority Based Dynamic Resource Allocation in Cloud Computing with Fault Tolerance". IEEE International Conference on Communication Networks (ICCN). (Year: 2015).*
At, Saraswathi et al. "Dynamic Resource Allocation Scheme in Cloud Computing". Procedia Computer Science 47, 30-36. Elsevier. CrossMark. ScienceDirect. (Year: 2015).*
Song, Hyojeong et al. "Throttle and Preempt: A New Flow Control for Real-Time Communications in Wormhole Networks". IEEE. (Year: 1997).*
PCT International Search Report dated Nov. 1, 2018, issued in corresponding International Application No. PCT/CN2018/100579 (4 pages).
Extended European Search Report dated Aug. 3, 2020, issued in EP Application No. 18848279.8 (10 pages).
Niu et al., "Employing Checkpoint to Improve Job Scheduling in Large-Scale Systems," Lecture Notes in Computer Science, vol. 7698, pp. 36-55 (2013).

* cited by examiner

Resource application D:
Obtained resources: CPU: 60; MEM: 60
Priority: 4

Resource application A:
Obtained resources: CPU: 40; MEM: 40
Priority: 3

Resource application B:
Obtained resources: CPU: 30; MEM: 20
Priority: 2

Resource allocation queue

*FIG. 4*

DISTRIBUTED SYSTEM RESOURCE ALLOCATION METHOD, APPARATUS, AND SYSTEM

CROSS-REFERENCE TO RELATED PATENT APPLICATIONS

This disclosure claims the benefit of priority to International Application No. PCT/CN2018/100579, filed on Aug. 15, 2018, which claims the benefits of priority to Chinese application number 201710737516.8 filed Aug. 24, 2017, both of which are incorporated herein by reference in their entireties.

TECHNICAL FIELD

Embodiments of this disclosure relate to the field of computer technologies, and in particular, to a distributed system resource allocation method, apparatus, and system.

BACKGROUND

In a distributed system, when a job node needs to apply for resources, a job management server can send a resource application request to a resource scheduling server to apply for a certain number of machine resources for use by the job node. The job node executes a specific job program in the distributed system, which generally only communicates with a job management server. The resource application request is applied for in the distributed system by the job management server. After receiving the resource application request, the resource scheduling server can calculate, according to remaining available resources in the distributed system, available resources that can be allocated to the job management server, generate a list of available resources, and send the list of available resources to the job management server. After receiving the list of available resources, the job management server can allocate the job node to a corresponding machine node to execute a job program. The machine node supervises the execution of a user's job program on behalf of a machine in the distributed system.

Overall resources of a cluster can often be exhausted in the distributed system, which leads to the queuing of resource applications. In general, resource application requests can be queued according to priorities, and resource requests can be periodically taken out of a waiting queue and resubmitted to request allocation of resources. In the waiting queue, high-priority resource requests are ranked at the top and low-priority resource requests are ranked at the bottom. When the resource scheduling server receives a high-priority resource application request that requires immediate allocation of resources, the resource scheduling server can force recycling of low-priority job resources in order to ensure that the resources can be quickly obtained by the high-priority resource applications, thus allowing the high-priority resource applications to preempt the low-priority job resources.

When resources of low-priority jobs are preempted by high-priority resource applications, the resource scheduling server can immediately recycle the resources of the low-priority jobs; in this case, the program of the low-priority jobs being executed can be terminated immediately and forcibly. If most of the low-priority jobs have been executed, the method of immediate termination of the jobs makes it necessary for the low-priority jobs to start from scratch after resources are obtained again, which reduces the resource utilization efficiency of the whole system.

SUMMARY

Embodiments of the present disclosure can provide distributed system resource allocation methods and apparatuses. The method comprises: receiving a resource preemption request sent by a resource scheduling server, the resource preemption request comprising job execution information corresponding to a first job management server; determining, according to the job execution information corresponding to the first job management server and comprised in the resource preemption request, resources to be returned by a second job management server and a resource return deadline; and returning, according to and the resource return deadline and a current job execution progress of the second job management server, the resources to be returned to the resource scheduling server before expiration of the resource return deadline.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 4 is a schematic diagram of an exemplary resource allocation queue, consistent with some embodiments of the present disclosure.

DETAILED DESCRIPTION

A distributed system resource allocation method, apparatus, and system are provided by some embodiments of the present disclosure, through which the time for returning resources can be determined according to job execution information of a job management server for resource preemption and a current job execution progress of a job management server for resource return, the utilization of system resources can be effectively improved, and resource waste can be reduced.

Terms used in the embodiments of this disclosure are merely used for describing specific embodiments, instead of limiting this disclosure. Singular forms "a(n)," "said," and "the" used in the embodiments of this disclosure and the appended claims also include plural forms, unless clearly specified in the context that other meanings are denoted. It should be further understood that the term "and/or" used in this text refers to and includes any or all possible combinations of one or more associated items listed.

Figure 1:
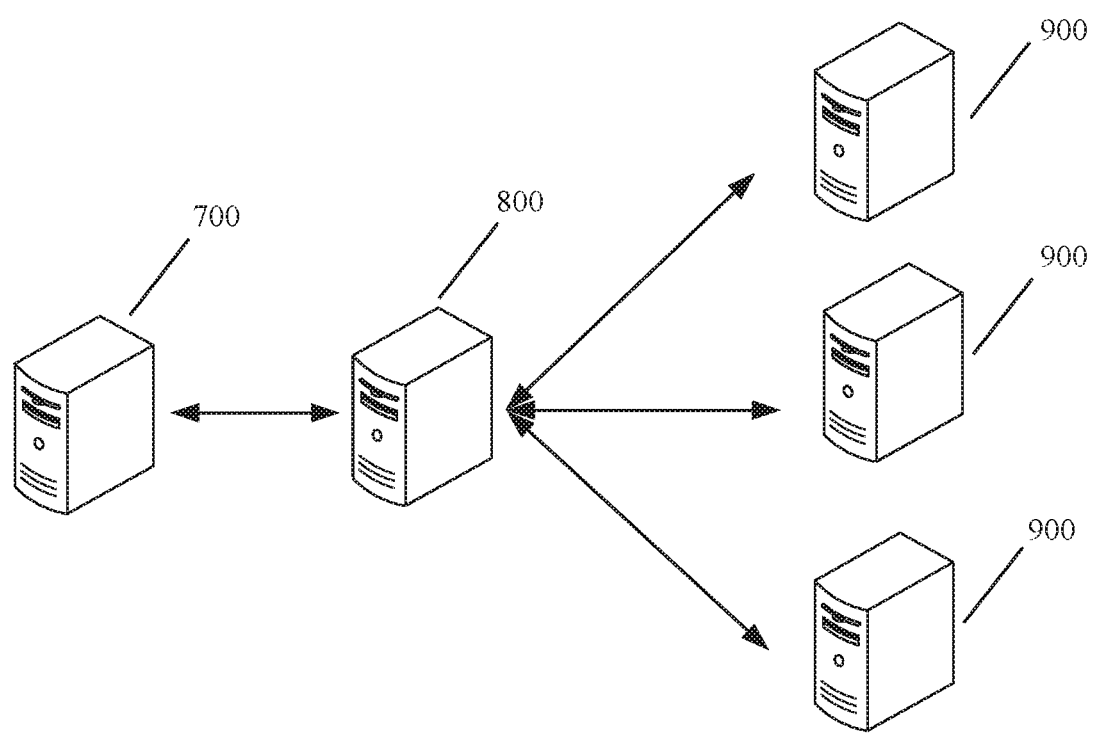
FIG. 1 is a schematic diagram of an exemplary distributed resource allocation system, consistent with some embodiments of the present disclosure.

Referring to FIG. 1, a distributed resource allocation system according to some embodiments of the present disclosure is shown. The distributed resource allocation system includes a resource scheduling server 800, a first job management server 700, and a second job management server 900. Resource scheduling server 800 coordinates and allocates available resources in a distributed system. A job management server controls all job nodes (Job Worker) of the job in the distributed system, responsible for applying for job resources from the resource scheduling server on behalf of all the job nodes and sending job programs to a machine node. A plurality of job management servers can be included in the distributed resource allocation system.

Conventionally, when resources of a low-priority job are preempted by a high-priority resource application, the resource scheduling server can immediately recycle the resources of the low-priority job. In this case, the program of the low-priority job being executed can be terminated immediately and forcibly. A higher priority indicates that the resource request is more important and should be met preferentially.

Conventional systems have the following characteristics: (1) Assuming that a low-priority job needs to be executed for 1 hour and has been executed for 55 minutes currently, it is expected that resources can be returned after the job is executed for another 5 minutes. If a resource preemption event occurs at this point, and the resource scheduling server forcibly recycles resources of the low-priority job, the resources are also wasted in the 55 minutes from the perspective of resource utilization of the whole system. (2) If the low-priority job can only cede resources to a high-priority job during execution, the violent recycling practice can result in a complete loss of the executed portion of the low-priority job and there is no chance to make a backup. When the low-priority job obtains resources again, the execution of the low-priority job has to start from scratch, thus reducing the execution efficiency. (3) Assuming that a high-priority job needs to be executed for 1 hour and the submission time of a resource application request is at an interval of 2 hours from the job output deadline, if the high-priority job preempts the resources of the low-priority job immediately and the low-priority job can be completely executed in only 5 minutes, such violent preemption at this point is unnecessary. The job output deadline is the latest time a user job can be completely executed.

If the resources of the low-priority job are directly violently recycled and allocated to the high-priority job without taking into account the execution time of the high-priority job, the output deadline, and the execution progress of the low-priority job, an unnecessary preemption event can occur, thereby reducing the resource utilization of the system. The execution time is the time it takes to completely execute a job.

A resource allocation method, apparatus, and system are provided in the present disclosure to replace the method of directly violently recycling allocated resources of a low-priority job. When a resource preemption event occurs, the resource scheduling server and a job management server of the low-priority job can perform a round of interactive negotiation at first, and comprehensively determine the resource recycle time of the low-priority job according to information such as the execution time of the high-priority job, the output deadline, and the execution progress of the low-priority job, so that it can be ensured that the high-priority job can obtain resources and the effective resource utilization of the system can be maximized at the same time.

As shown in FIG. 1, the distributed resource allocation system includes a resource scheduling server 800, a first job management server 700, and a second job management server 900.

The first job management server 700 is configured to send a resource application request to the resource scheduling server, the resource application request including at least job execution information of the first job management server 700.

The resource scheduling server 800 is configured to determine the first job management server 700 for resource preemption and the second job management server 900 for resource return when it is judged that a resource preemption condition is met; send a resource preemption request to the second job management server 900 for resource return, the resource preemption request including at least job execution information corresponding to the first job management server 700 for resource preemption; and receive a resource return request sent by the second job management server 900 for resource return, and allocate resources corresponding to the resource return request to the first job management server 700 for resource preemption.

The second job management server 900 is configured to receive the resource preemption request sent by the resource scheduling server 800, and determine, according to the job execution information corresponding to the first job management server 700 included in the resource preemption request, a resource return deadline of the second job management server 900; and return, according to the determined resource return deadline and a current job execution progress of the second job management server 900, the resources to be returned to the resource scheduling server 800. The resource return deadline is the latest time the job management server returns the resources.

The resource allocation system according to some embodiments of the present disclosure is briefly introduced above. Resource allocation methods according to the embodiments of this disclosure are introduced below from the perspective of a first job management server, a resource scheduling server, and a second job management server respectively.

The resource allocation methods according to the embodiments of this disclosure are introduced below with reference to FIG. 2 to FIG. 5.

Figure 2:
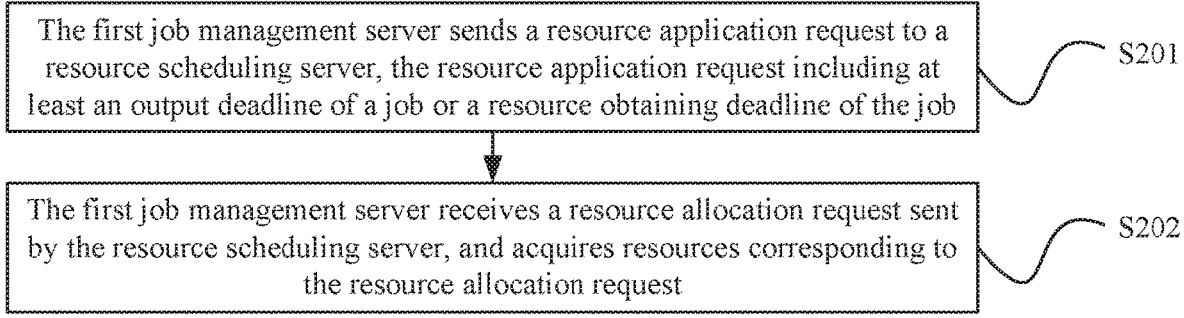
FIG. 2 is a flowchart of an exemplary distributed system resource allocation method, consistent with some embodiments of the present disclosure.

Referring to FIG. 2, a flowchart of a distributed system resource allocation method according to some embodiments of the present disclosure is shown. As shown in FIG. 2, the method is applied to a first job management server and can include the following steps.

In step S201, the first job management server sends a resource application request to a resource scheduling server, the resource application request including at least an output deadline of a job or a resource obtaining deadline of the job. The resource obtaining deadline is the latest time the job management server obtains the resources In a specific implementation, the first job management server that needs to obtain resources can send a resource application request to the resource scheduling server. In a possible implementation, the resource application request includes an output deadline of a job, that is, the latest output time of the job. In such an implementation, the resource application request only includes the output deadline of the job, and the execution time of the job is calculated by the resource scheduling server. For example, the resource scheduling server acquires historical data of the job and obtains the execution time of the job by calculation according to the historical data of the job. For example, the execution time of the job is generally regular and can be determined by the job management server or the resource scheduling server according to historical data such as the average execution time of the job over the past 7 days.

In another possible implementation, the resource application request can include an output deadline of a job and execution time of the job. It should be noted that the execution time of the job generally refers to the time required for completing the execution of the job. For example, it can be the duration from the time when resources are obtained and the job is started to the time when the job is completed and the resources are returned. In general, the execution time of the job can be determined in the following manners. (1) A user can specify the execution time of the job. For example, when a user job is formally submitted to a distributed system for execution, offline debugging must be carried out. The execution time of the user job can be estimated through offline debugging, and the execution time of the job can be specified or set by the user when a resource application request is submitted. (2) Historical data of the job is acquired, and the execution time of the job is obtained by calculation according to the historical data of the job.

In another possible implementation, the resource application request includes a resource obtaining deadline of the job. In a specific implementation, the first job management server can determine execution time and an output deadline of the job, and obtain the resource obtaining deadline of the job according to a difference between the output deadline of the job and the execution time of the job. For example, resource obtaining deadline TA_Recieve=output deadline− execution time. For example, an output deadline of a certain job is 22:00, the execution time of the job is 2 hours, and the resource obtaining deadline is 20:00.

In other implementations, the resource application request can also include the execution time of the job, the output deadline of the job, and the resource obtaining deadline, which is not limited here.

In step S202, the first job management server receives a resource allocation request sent by the resource scheduling server, and acquires resources corresponding to the resource allocation request.

In a conventional system, the resource application request only includes the request submission time, the resource application request in the present disclosure further includes execution information of the job, and a resource obtaining deadline and/or a resource return deadline of the job are/is determined accordingly. Resource allocation and return time can be determined more flexibly, and the resource utilization efficiency can be effectively improved.

Figure 3:
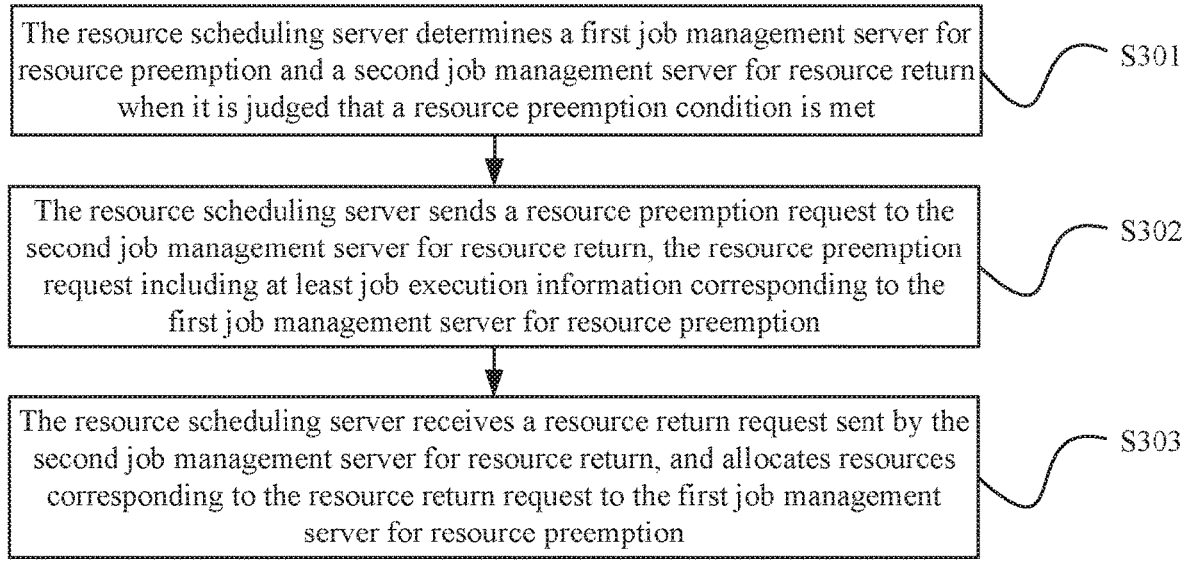
FIG. 3 is a flowchart of an exemplary distributed system resource allocation method, consistent with some embodiments of the present disclosure.

Referring to FIG. 3, a flowchart of a distributed system resource allocation method according to some embodiments of the present disclosure is provided. As shown in FIG. 3, the method is applied to a resource scheduling server, and can include the following steps.

In step S301, the resource scheduling server determines a first job management server for resource preemption and a second job management server for resource return when it is judged that a resource preemption condition is met.

In a specific implementation, the judging that a resource preemption condition is met includes: judging that the resource preemption condition is met when it is determined that the priority of the received resource application request is high and the quantity of remaining available resources of the system is less than the quantity of resources requested by the resource application request. For example, the first job management server sends a resource application request C to the resource scheduling server. It is assumed that resources that the first job management server needs to apply for are CPU: 70 and MEM: 60, and the priority of the resource application request is 4. At this point, remaining available resources of the system are CPU: 0 and MEM: 0, and in this case, the remaining available resources of the system cannot meet or cannot fully meet the request of the high-priority job, and resource preemption can be triggered. The resource scheduling server can traverse a resource allocation queue to determine the job management server that needs to return resources. Specifically, there is a resource allocation queue in the resource scheduling server, which records resource allocation of the resource scheduling server to resource applications. This queue is ranked according to priorities of the resource applications. When a high-priority resource application is submitted to the resource scheduling server and the remaining resources of the system are insufficient to meet the resource application, the resource scheduling server can traverse the resource allocation queue in an order from lower priorities to higher priorities. For each resource application with a priority lower than that of the high-priority resource application, it is first assumed that all its allocated resources are recycled and then accumulated with remaining resources of a cluster. It is judged whether new remaining resources obtained after accumulation can meet the high-priority resource application. If yes, the traversal is stopped. If no, the resource scheduling server continues to traverse the next low-priority resource application until the high-priority resource application can be met. Used resources of all low-priority jobs can be preempted by the high-priority job. As shown in FIG. 4, a schematic diagram of a resource allocation queue according to some embodiments of the present disclosure is shown. For example, it is assumed that the resource allocation queue is traversed in an order from low priorities to high priorities. Assuming that allocated resources of a resource application B are all preempted, new remaining resources are CPU: 30 and MEM: 20. This is insufficient to meet the high-priority resource application. The resource application B is continuously traversed. Assuming that its allocated resources are all preempted, new remaining resources are CPU: 70 and MEM: 60. In this case, the remaining resources can meet the high-priority resource application. Then, the second job management server for resource return is determined as job management servers corresponding to the resource application B and the resource application A.

In step S302, the resource scheduling server sends a resource preemption request to the second job management server for resource return, the resource preemption request including at least job execution information corresponding to the first job management server for resource preemption.

Different from the method of directly violently recycling allocated resources of the second job management server for resource return in a conventional system. In the embodiments of this disclosure, the resource scheduling server sends a resource preemption request to the second job management server for resource return to notify the second job management server that it needs to return resources to high-priority jobs.

In a possible implementation, the resource application request sent by the first job manager to the resource scheduling server only includes an output deadline of a job, and job execution information of the first job management server included in the resource preemption request can include the output deadline of the job and execution time of the job. The execution time of the job is determined in the following manner: the resource scheduling server acquires historical data of the job and obtains the execution time of the job by calculation according to the historical data of the job.

In another possible implementation, the resource application request sent by the first job manager to the resource scheduling server includes an output deadline of a job and execution time of the job, and job execution information of the first job management server included in the resource preemption request can include the output deadline of the job and the execution time of the job. Alternatively, the job execution information of the first job management server included in the resource preemption request can include a resource obtaining deadline of the job. The resource obtaining deadline of the job is determined in the following manner.

In another possible implementation, the resource application request sent by the first job manager to the resource scheduling server includes a resource obtaining deadline of the job, and job execution information of the first job management server included in the resource preemption request can include the resource obtaining deadline of the job.

When the resource scheduling server determines that the second job management server for resource return includes a plurality of job management servers, the resource scheduling server sends a resource preemption request to the plurality of job management servers respectively.

In step S303, the resource scheduling server receives a resource return request sent by the second job management server for resource return, and allocates resources corresponding to the resource return request to the first job management server for resource preemption.

It should be noted that when determining a first job management server for resource preemption and a second job management server for resource return, the resource scheduling server can record a correspondence between the first job management server and the second job management server. When the second job management server sends a resource return request, returned resources can be allocated to the corresponding first job management server and are not be allocated to other waiting job management servers, thus ensuring that high-priority jobs can quickly get the resources.

Figure 5:
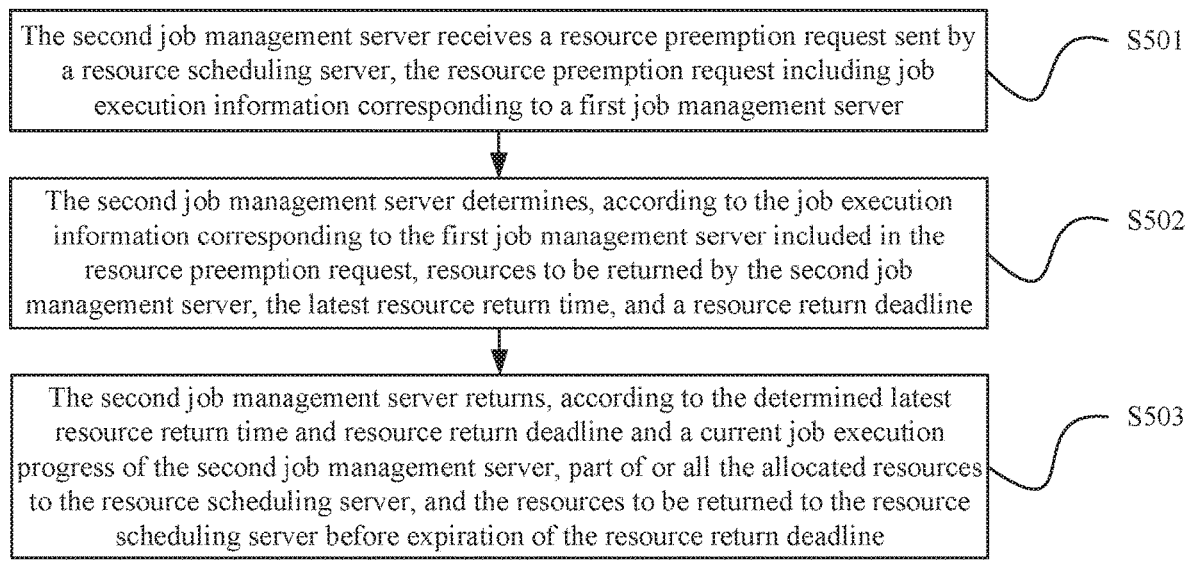
FIG. 5 is a flowchart of an exemplary distributed system resource allocation method, consistent with some embodiments of the present disclosure.

Referring to FIG. 5, a flowchart of a distributed system resource allocation method according to some embodiments of the present disclosure is shown. As shown in FIG. 5, the method is applied to a second job management server and can include the following steps.

In step S501, the second job management server receives a resource preemption request sent by a resource scheduling server, the resource preemption request including job execution information corresponding to a first job management server.

The job execution information corresponding to the first job management server can include an output deadline of the job and execution time of the job, or the job execution information includes a resource obtaining deadline of the job.

It should be noted that the resource preemption request can further include the quantity of returned resources, and the second job management server can determine to return part of or all the allocated resources according to the quantity of the returned resources.

In step S502, the second job management server determines, according to the job execution information corresponding to the first job management server and included in the resource preemption request, resources to be returned by the second job management server and a resource return deadline.

In some implementations, the job execution information corresponding to the first job management server includes an output deadline of the job and execution time of the job, and the determining, according to the job execution information corresponding to the first job management server and included in the resource preemption request, resources to be returned by the second job management server and a resource return deadline includes: obtaining a resource obtaining deadline of the job according to a difference between the output deadline of the job and the execution time of the job, and taking the resource obtaining deadline of the job as the resource return deadline of the second job management server.

In another implementation, the job execution information corresponding to the first job management server includes a resource obtaining deadline of the job, and the resource obtaining deadline can be taken as a resource return deadline.

In step S503, the second job management server returns, according to the determined resource return deadline and a current job execution progress of the second job management server, the resources to be returned to the resource scheduling server before expiration of the resource return deadline.

In some implementations, the returning, according to the determined resource return deadline and a current job execution progress of the second job management server, the resources to be returned to the resource scheduling server before expiration of the resource return deadline includes: obtaining remaining time for completion of the current job by calculation according to the current job execution progress of the second job management server; and returning, by the second job management server, the resources to be returned to the resource scheduling server after execution of the current job is completed if it is judged that a sum of the current time and the remaining time for completion of the current job is not greater than the resource return deadline.

In some implementations, the returning, according to the determined resource return deadline and a current job execution progress of the second job management server, the resources to be returned to the resource scheduling server before expiration of the resource return deadline includes: obtaining remaining time for completion of the current job by calculation according to the current job execution progress of the second job management server; and the second job management server backing up the current job, recording a backup position, and returning the resources to be returned to the resource scheduling server after the backup is completed if it is judged that a sum of the current time and the remaining time for completion of the current job is greater than the resource return deadline. Further, the method also includes: receiving resources re-allocated by the resource scheduling server, acquiring the backup of the current job, and resuming the execution of the current job from the backup position.

For example, after receiving the resource preemption request sent by the resource scheduling server, the second job management server can determine the final resource return time TA_Return and obtain the remaining time for completion of the job according to the time TA_run for which the current job has been executed and estimated execution time of the job TA_all: TA_left=TA_all−TA_run. If the current time+TA_left<=TA_Return, the resources are returned naturally after the execution of the job A is completed. If the current time+TA_left>TA_Return, the job A starts recording backups when its execution is close to the time point of TA_Return, so that the execution can be resumed from the backup position, rather than from scratch, when resources are obtained again. After the backups are completely recorded, the second job management server actively returns the resources to the resource scheduling server and at the same time, waits for the resource scheduling server to re-allocate the resources.

Figure 6:
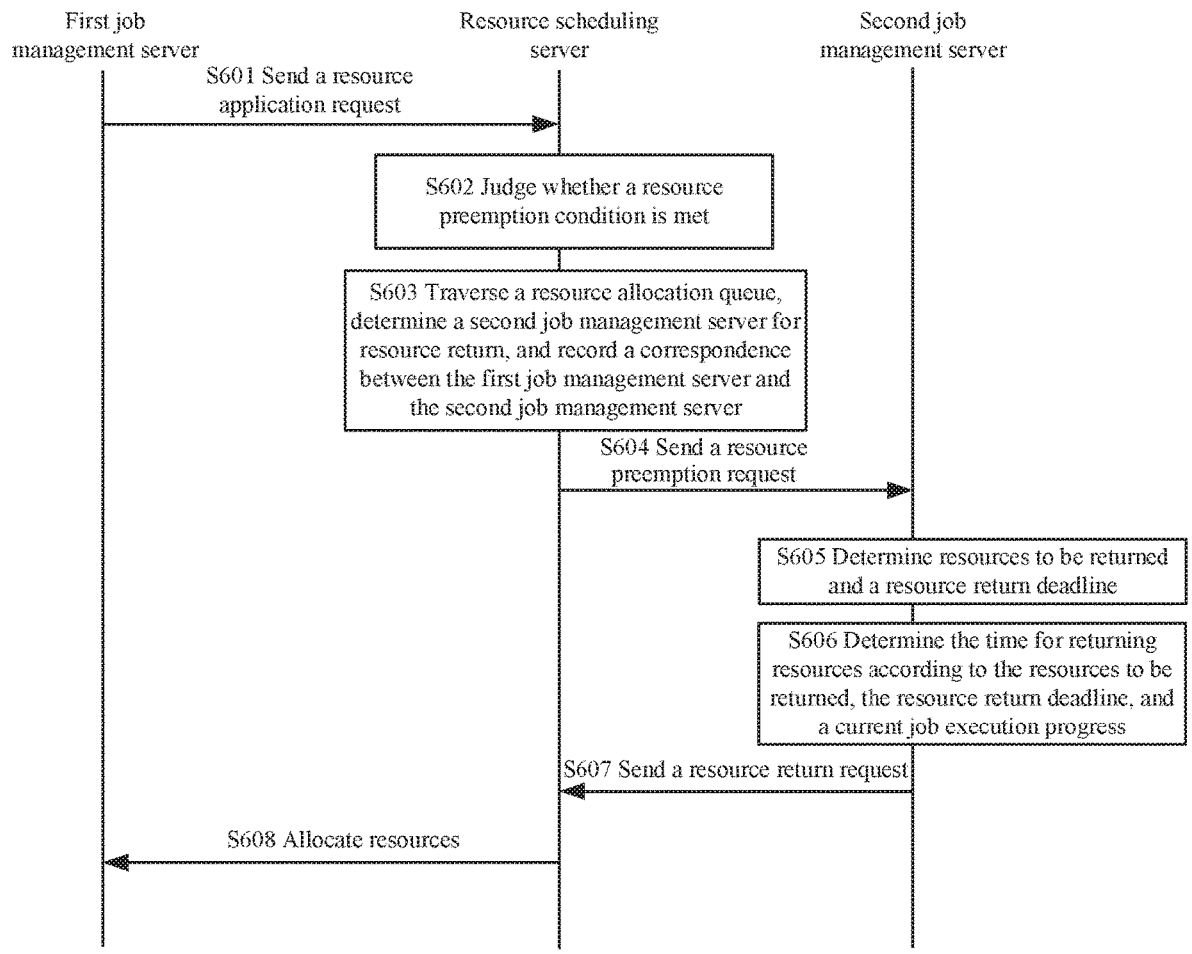
FIG. 6 is a flowchart of an exemplary distributed system resource allocation method, consistent with some embodiments of the present disclosure.

Referring to FIG. 6, a flowchart of a distributed system resource allocation method according to some embodiments of the present disclosure is shown. As shown in FIG. 6, the method can include the following steps.

In step S601, a first job management server sends a resource application request to a resource scheduling server. The resource application request includes an output deadline of a job and execution time of the job.

In step S602, the resource scheduling server receives the resource application request and judges whether a resource preemption condition is met.

In step S603, the resource scheduling server determines that the resource preemption condition is met, traverses a resource allocation queue, determines a second job management server for resource return, and records a correspondence between the first job management server and the second job management server. A plurality of second job management servers can be determined as a job management server for resource return.

In step S604, the resource scheduling server sends a resource preemption request to the second job management server. The resource preemption request includes an output deadline of a job and execution time of the job of the first job management server.

In step S605, the second job management server determines a resource return deadline. The second job management server obtains a resource obtaining deadline of the job according to a difference between the output deadline of the job and the execution time of the job, and takes the resource obtaining deadline of the job as the resource return deadline of the second job management server.

In step S606, the second job management server determines the time for returning resources according to the resource return deadline and a current job execution progress of the second job management server.

The second job management server obtains the remaining time for completion of the current job by calculation according to the current job execution progress of the second job management server. The second job management server returns the resources to be returned to the resource scheduling server after execution of the current job is completed if it is judged that a sum of the current time and the remaining time for completion of the current job is not greater than the resource return deadline. The second job management server backs up the current job, records a backup position, and returns the resources to be returned to the resource scheduling server after the backup is completed if it is judged that a sum of the current time and the remaining time for completion of the current job is greater than the resource return deadline.

In step S607, the second job management server sends a resource return request.

In step S608, the resource scheduling server allocates resources to the first job management server.

According to the resource allocation method provided in some embodiments of the present disclosure, the resource utilization efficiency of the system can be improved to the greatest extent while it is ensured that resources can be quickly obtained by high-priority jobs.

Devices corresponding to the methods provided in the embodiments of this disclosure are introduced below.

Figure 7:
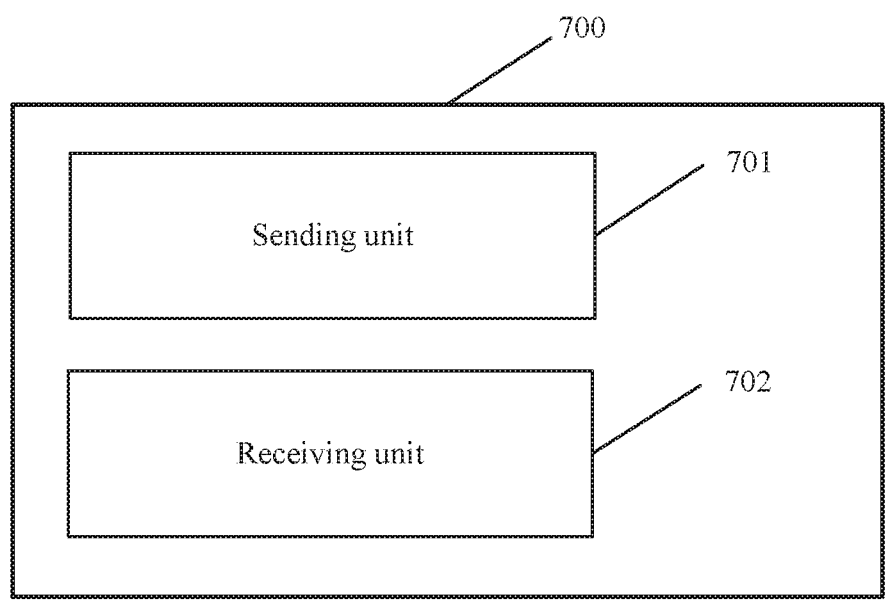
FIG. 7 is a schematic diagram of an exemplary first job management server, consistent with some embodiments of the present disclosure.

Referring to FIG. 7, a schematic diagram of a first job management server according to some embodiments of the present disclosure is shown.

A first job management server apparatus 700 includes a sending unit 701 and a receiving unit 702.

Sending unit 701 is configured to send a resource application request to a resource scheduling server. The resource application request includes at least an output deadline of a job or a resource obtaining deadline of the job. Sending unit 701 can be implemented with reference to step S201 in the embodiments shown in FIG. 2.

Receiving unit 702 is configured to receive a resource allocation request sent by the resource scheduling server, and acquire resources corresponding to the resource allocation request. Receiving unit 702 can be implemented with reference to S202 in the embodiments shown in FIG. 2.

Figure 8:
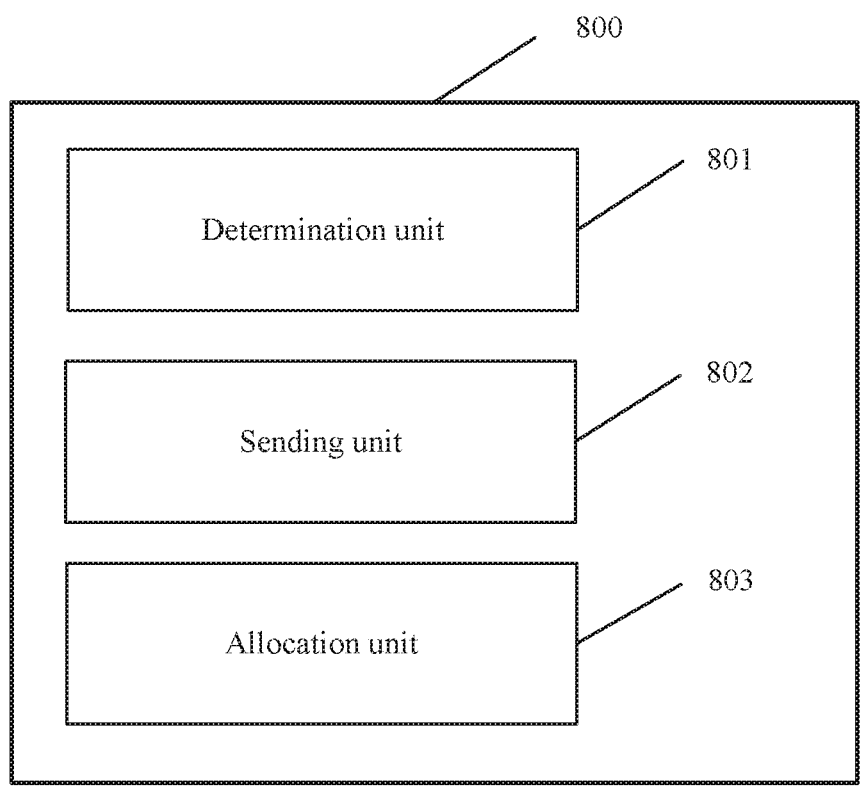
FIG. 8 is a schematic diagram of an exemplary resource scheduling server, consistent with some embodiments of the present disclosure.

Referring to FIG. 8, a schematic diagram of a resource scheduling server according to some embodiments of the present disclosure is shown.

A resource scheduling server 800 includes a determination unit 801, a sending unit 802, and an allocation unit 803.

Determination unit 801 is configured to determine a first job management server for resource preemption and a second job management server for resource return when it is judged that a resource preemption condition is met. The specific implementation of the determination unit 801 can be obtained with reference to S301 in the embodiments shown in FIG. 3.

Sending unit 802 is configured to send a resource preemption request to the second job management server for resource return, the resource preemption request including at least job execution information corresponding to the first job management server for resource preemption. Sending unit 802 can be obtained with reference to S302 in the embodiments shown in FIG. 3.

Allocation unit 803 is configured to receive a resource return request sent by the second job management server for resource return, and allocate resources corresponding to the resource return request to the first job management server for resource preemption. Allocation unit 803 can be implemented with reference to S303 in the embodiments shown in FIG. 3.

In some implementations, the resource scheduling server further includes a judging unit. The judging unit is configured to judge that the resource preemption condition is met when it is determined that the priority of the received resource application request is high and the quantity of remaining available resources of the system is less than the quantity of resources requested by the resource application request.

In some implementations, the job execution information corresponding to the first job management server sent by the sending unit includes an output deadline of the job and execution time of the job, or the job execution information includes a resource obtaining deadline of the job.

In some implementations, the resource application request of the first job management server received by the receiving unit includes the output deadline of the job. The execution time of the job sent by the sending unit is determined in the following manner: acquiring historical data of the job, and obtaining the execution time of the job by calculation according to the historical data of the job. The resource obtaining deadline of the job sent by the sending unit is determined in the following manner: obtaining the resource obtaining deadline of the job according to a difference between the output deadline of the job and the execution time of the job.

Figure 9:
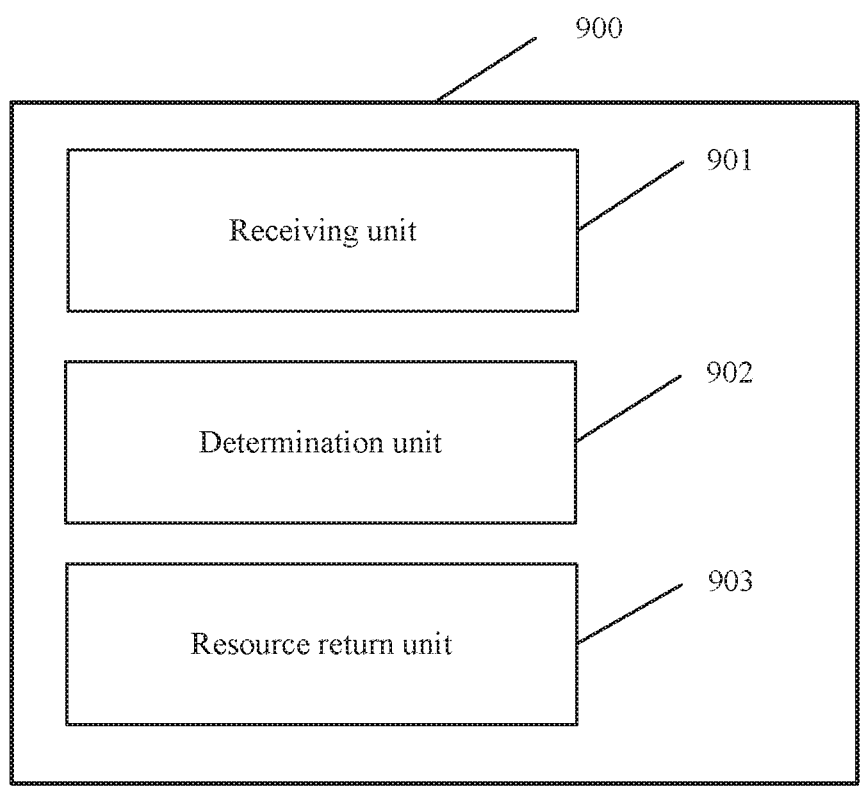
FIG. 9 is a schematic diagram of an exemplary second job management server, consistent with some embodiments of the present disclosure.

Referring to FIG. 9, a schematic diagram of a second job management server according to some embodiments of the present disclosure is shown.

A second job management server 900 includes a receiving unit 901, a determination unit 902, and a resource return unit 903.

Receiving unit 901 is configured to receive a resource preemption request sent by a resource scheduling server, the resource preemption request including job execution information corresponding to a first job management server. Receiving unit 901 can be implemented with reference to S501 in the embodiments shown in FIG. 5.

Determination unit 902 is configured to determine, according to the job execution information corresponding to the first job management server and included in the resource preemption request, resources to be returned by the second job management server and a resource return deadline. Determination unit 902 can be implemented with reference to S502 in the embodiments shown in FIG. 5.

Resource return unit 903 is configured to return, according to the determined resource return deadline and a current job execution progress of the second job management server, the resources to be returned to the resource scheduling server before expiration of the resource return deadline. Resource return unit 903 can be obtained with reference to S503 in the embodiments shown in FIG. 5.

In some implementations, the job execution information corresponding to the first job management server received by the receiving unit includes an output deadline of the job and execution time of the job. The determination unit is configured to obtain a resource obtaining deadline of the job according to a difference between the output deadline of the job and the execution time of the job, and take the resource obtaining deadline of the job as the resource return deadline of the second job management server.

In some implementations, the resource return unit is specifically configured to: obtain remaining time for completion of the current job by calculation according to the current job execution progress of the second job management server; and return, by the second job management server, the resources to be returned to the resource scheduling server after execution of the current job is completed if it is judged that a sum of the current time and the remaining time for completion of the current job is not greater than the resource return deadline.

In some implementations, the resource return unit is specifically configured to: obtain remaining time for completion of the current job by calculation according to the current job execution progress of the second job management server; and back up, by the second job management server, the current job, record a backup position, and return the resources to be returned to the resource scheduling server after the backup is completed if it is judged that a sum of the current time and the remaining time for completion of the current job is greater than the resource return deadline.

In some implementations, the second job management server further includes an acquisition unit. The acquisition unit is configured to receive resources re-allocated by the resource scheduling server, acquire the backup of the current job, and resume the execution of the current job from the backup position.

Figure 10:
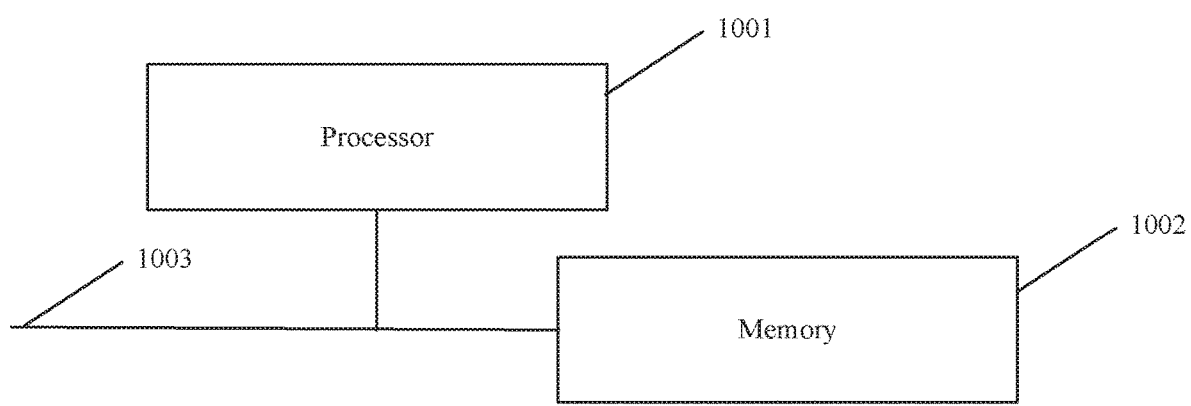
FIG. 10 is a block diagram of an exemplary apparatus for resource allocation, consistent with some embodiments of the present disclosure.

Referring to FIG. 10, a block diagram of an apparatus for resource allocation according to some embodiments of the present disclosure is shown. The apparatus includes: at least one processor 1001 (such as a CPU), a memory 1002, and at least one communication bus 1003 configured to implement connection communications between the apparatuses. The processor 1001 is configured to execute executable modules stored in the memory 1002, such as computer programs. The memory 1002 can include a high-speed Random Access Memory (RAM), and can also include a non-volatile memory, such as at least one magnetic disk memory. One or more programs are stored in the memory, and configured to be executed by the one or more processors 1001, and the one or more programs include instructions for performing the following operations: receiving a resource preemption request sent by a resource scheduling server, the resource preemption request including job execution information corresponding to a first job management server; determining, according to the job execution information corresponding to the first job management server and included in the resource preemption request, resources to be returned by the second job management server and a resource return deadline; and returning, according to the determined resource return deadline and a current job execution progress of the second job management server, the resources to be returned to the resource scheduling server before expiration of the resource return deadline.

In some implementations, the processor 1001 is specifically configured to execute the one or more programs including instructions for performing the following operations: when the job execution information corresponding to the first job management server includes an output deadline of the job and execution time of the job, obtaining a resource obtaining deadline of the job according to a difference between the output deadline of the job and the execution time of the job, and taking the resource obtaining deadline of the job as the resource return deadline of the second job management server.

In some implementations, the processor 1001 is specifically configured to execute the one or more programs including instructions for performing the following operations: obtaining remaining time for completion of the current job by calculation according to the current job execution progress of the second job management server; and returning, by the second job management server, the resources to be returned to the resource scheduling server after execution of the current job is completed if it is judged that a sum of the current time and the remaining time for completion of the current job is not greater than the resource return deadline.

In some implementations, the processor 1001 is specifically configured to execute the one or more programs including instructions for performing the following operations: obtaining remaining time for completion of the current job by calculation according to the current job execution progress of the second job management server; and the second job management server backing up the current job, recording a backup position, and returning the resources to be returned to the resource scheduling server after the backup is completed if it is judged that a sum of the current time and the remaining time for completion of the current job is greater than the resource return deadline.

In some implementations, the processor 1001 is specifically configured to execute the one or more programs including instructions for performing the following operations: receiving resources re-allocated by the resource scheduling server, acquiring the backup of the current job, and continuing to execute the current job from the backup position.

The one or more programs can also include instructions for performing the following operations: determining a first job management server for resource preemption and a second job management server for resource return when it is judged that a resource preemption condition is met; sending a resource preemption request to the second job management server for resource return, the resource preemption request including at least job execution information corresponding to the first job management server for resource preemption; and receiving a resource return request sent by the second job management server for resource return, and allocating resources corresponding to the resource return request to the first job management server for resource preemption.

In some implementations, the processor 1001 is specifically configured to execute the one or more programs including instructions for performing the following operations: judging that the resource preemption condition is met when it is determined that the priority of the received resource application request is high and the quantity of remaining available resources of the system is less than the quantity of resources requested by the resource application request.

In some implementations, the processor 1001 is specifically configured to execute the one or more programs including instructions for performing the following operations: acquiring historical data of the job, and obtaining the execution time of the job by calculation according to the historical data of the job; and obtaining the resource obtaining deadline of the job according to a difference between the output deadline of the job and the execution time of the job.

The one or more programs can also include instructions for performing the following operations: sending a resource application request to a resource scheduling server, the resource application request including at least an output deadline of a job or a resource obtaining deadline of the job; and receiving a resource allocation request sent by the resource scheduling server, and acquiring resources corresponding to the resource allocation request.

In some embodiments, a non-volatile computer readable medium including instructions is further provided, for example, a memory 304 including instructions. The instructions can be executed by a processor 320 of an apparatus 300 to implement the above method. For example, the non-volatile computer readable medium can be an ROM, a RAM, a CD-ROM, a magnetic tape, a floppy disk, an optical data storage device, and so on.

A machine-readable medium is provided. For example, the machine-readable medium can be a non-volatile computer readable medium. When instructions in the medium are executed by a processor of an apparatus (a terminal or server), the apparatus can perform the distributed system resource allocation method as shown in FIG. 1. The method includes: receiving a resource preemption request sent by a resource scheduling server, the resource preemption request including job execution information corresponding to a first job management server; determining, according to the job execution information corresponding to the first job management server, resources to be returned by the second job management server and a resource return deadline; and returning, according to the determined resources to be returned and resource return deadline and a current job execution progress of the second job management server, the resources to be returned to the resource scheduling server before expiration of the resource return deadline.

The setting of the units or modules in the apparatus of this disclosure can be implemented with reference to the methods shown in FIG. 2 to FIG. 6, which are not described in detail here.

After considering the specification and practicing the invention disclosed here, those skilled in the art can easily think of other implementation solutions of this disclosure. This disclosure is intended to cover any variations, uses or adaptive changes of this disclosure that follow the general principle of this disclosure and include common knowledge or common technical means in the art not disclosed in the present disclosure. The specification and embodiments are only considered exemplary and the true scope and spirit of this disclosure are indicated by the claims below.

It would be appreciated that this disclosure is not limited to the precise structure described above and shown in the accompanying drawings and can be modified and altered without departing from its scope. The scope of this disclosure is limited only by the appended claims.

It should be noted that in this text, the relation terms such as first and second are merely used to distinguish one entity or operation from another entity or operation, and do not require or imply that the entities or operations have this actual relation or order. Moreover, the terms "include," "comprise" or other variations thereof are intended to cover non-exclusive inclusion, so that a process, method, article or device including a series of elements not only includes the elements, but also includes other elements not clearly listed, or further includes elements inherent to the process, method, article or device. In the absence of more limitations, an element defined by "including a/an . . . " does not exclude that the process, method, article or device including the element further has other identical elements. This disclosure may be described in a common context of a computer executable instruction executed by a computer, for example, a program module. Generally, the program module includes a routine, a program, an object, an assembly, a data structure, and the like for executing a specific task or implementing a specific abstract data type. This disclosure may also be practiced in distributed computing environments, and in the distributed computer environments, a task is executed by using remote processing devices connected through a communications network. In the distributed computer environments, the program module may be located in local and remote computer storage media including a storage device.

The embodiments of the present disclosure are all described in a progressive manner, each embodiment emphasizes a difference between it and other embodiments, and identical or similar parts in the embodiments may be obtained with reference to each other. In particular, the apparatus embodiment is basically similar to the method embodiment, so that it is described simply. For related parts, refer to the descriptions of the parts in the method embodiment. The apparatus embodiment described above is merely schematic. The units described as separate parts may or may not be physically separate, and parts displayed as units may or may not be physical units, i.e., may be located in one position, or may be distributed on a plurality of network units. Some of or all the modules therein may be selected according to actual needs to achieve the objectives of the solutions of the embodiments. Those of ordinary skill in the art can understand and implement this disclosure without creative efforts. The above descriptions are merely specific implementations of this disclosure. It should be noted that those of ordinary skill in the art can also make several improvements and modifications without departing from the principle of this disclosure. The improvements and modifications should also be regarded as the protection scope of this disclosure.

What is claimed is:

1. A distributed system resource allocation method for managing resources of a computer system, the method comprising:
    receiving, by a resource scheduling server, a resource application request from a first job management server, the first job management server executing a high priority job, and the resource application request including an output deadline and an execution time of the high priority job;
    identifying, by the resource scheduling server, a second job management server executing a low priority job of a plurality of job management servers;
    receiving, by the second job management server, a resource preemption request from the resource scheduling server when a resource preemption condition is met, the resource preemption request including the output deadline and the execution time of the high priority job executing on the first job management server;
    calculating, by the second job management server, a resource obtaining deadline of the high priority job according to a difference between the output deadline and the execution time of the high priority job;
    when a sum of the current time and the remaining time for completion of executing the low priority job on the second job management server is greater than or equal to the resource obtaining deadline, the second job management server performs the steps of (i) backing up the low priority job, (ii) recording a backup position, and (iii) allocating resources to the resource scheduling server that were being utilized by the low priority job after the backup is completed, wherein the second job management server continues to execute the low priority job as long as a sum of a time to perform steps (i) and (ii) and the current time is less than the resource obtaining deadline;
    allocating, by the resource scheduling server, the resources that were allocated to the resource scheduling server from the second job management server to the first job management server; and
    executing, by the first job management server, the high priority job utilizing the resources allocated from the resource scheduling server.

2. The method of claim 1, further comprising:
    receiving, by the second job management server, resources re-allocated by the resource scheduling server;
    acquiring the backup of the low priority job by the second job management server; and
    resuming, by the second job management server, the execution of the low priority job from the backup position.

3. An apparatus for resource allocation for managing resources of a computer system, comprising:
    a memory storing a set of instructions; and
    one or more processors configured to execute the set of instructions to cause the apparatus to perform:
        receiving, by a resource scheduling server, a resource application request from a first job management server, the first job management server executing a high priority job, and the resource application request including an output deadline and an execution time of the high priority job;
        identifying, by the resource scheduling server, a second job management server executing a low priority job of a plurality of job management servers;
        receiving, by the second job management server, a resource preemption request from the resource scheduling server when a resource preemption condition is met, the resource preemption request including the output deadline and the execution time of the high priority job executing on the first job management server;
        calculating, by the second job management server, a resource obtaining deadline of the high priority job according to a difference between the output deadline and the execution time of the high priority job;
        when a sum of the current time and the remaining time for completion of executing the low priority job on the second job management server is greater than or equal to the resource obtaining deadline, the second job management server performs the steps of (i) backing up the low priority job, (ii) recording a backup position, and (iii) allocating resources to the resource scheduling server that were being utilized by the low priority job after the backup is completed, wherein the second job management server continues to execute the low priority job as long as a sum of a time to perform steps (i) and (ii) and the current time is less than the resource obtaining deadline;
        allocating, by the resource scheduling server, the resources that were allocated to the resource scheduling server from the second job management server to the first job management server; and
        executing, by the first job management server, the high priority job utilizing the resources allocated from the resource scheduling server.

4. The apparatus of claim 3, wherein the set of instructions that are executable by the one or more processors are further configured to perform:
    receiving, by the second job management server, resources re-allocated by the resource scheduling server;
    acquiring the backup of the low priority job by the second job management server; and
    resuming, by the second job management server, the execution of the low priority job from the backup position.

5. A non-transitory computer readable medium that stores a set of instructions that is executable by at least one processor of a computer to cause the computer to perform a network management method for managing resources of a computer system, the method comprising:
    receiving, by a resource scheduling server, a resource application request from a first job management server, the first job management server executing a high priority job, and the resource application request including an output deadline and an execution time of the high priority job;

identifying, by the resource scheduling server, a second job management server executing a low priority job of a plurality of job management servers;

receiving, by the second job management server, a resource preemption request from the resource scheduling server when a resource preemption condition is met, the resource preemption request including the output deadline and the execution time of the high priority job executing on the first job management server;

calculating, by the second job management server, a resource obtaining deadline of the high priority job according to a difference between the output deadline and the execution time of the high priority job;

when a sum of the current time and the remaining time for completion of executing the low priority job on the second job management server is greater than or equal to the resource obtaining deadline, the second job management server performs the steps of (i) backing up the low priority job, (ii) recording a backup position, and (iii) allocating resources to the resource scheduling server that were being utilized by the low priority job after the backup is completed, wherein the second job management server continues to execute the low priority job as long as a sum of a time to perform steps (i) and (ii) and the current time is less than the resource obtaining deadline;

allocating, by the resource scheduling server, the resources that were allocated to the resource scheduling server from the second job management server to the first job management server; and executing, by the first job management server, the high priority job utilizing the resources allocated from the resource scheduling server.

6. The non-transitory computer readable medium of claim 5, wherein the set of instructions that are executable by the at least one processor of a computer to cause the computer to further perform:

receiving, by the second job management server, resources re-allocated by the resource scheduling server;

acquiring the backup of the low priority job by the second job management server; and resuming, by the second job management server, the execution of the low priority job from the backup position.

* * * * *